US012623485B2

(12) United States Patent
Migas et al.

(10) Patent No.: US 12,623,485 B2
(45) Date of Patent: May 12, 2026

(54) REMOVABLE AERODYNAMIC WHEEL COVER

(71) Applicant: mantaLABS LLC, Crawfordsville, IN (US)

(72) Inventors: Jeremiah Migas, Crawfordsville, IN (US); Raul Maturana, Brownburg, IN (US); Zachary McCoy, Whitestown, IN (US)

(73) Assignee: MANTALABS LLC, Crawfordsville, IN (US)

( * ) Notice: Subject to any disclaimer, the term of this patent is extended or adjusted under 35 U.S.C. 154(b) by 296 days.

(21) Appl. No.: 18/483,093

(22) Filed: Oct. 9, 2023

(65) Prior Publication Data

US 2024/0123762 A1     Apr. 18, 2024

Related U.S. Application Data

(60) Provisional application No. 63/379,331, filed on Oct. 13, 2022.

(51) Int. Cl.
B60B 7/06          (2006.01)
B60B 7/04          (2006.01)

(52) U.S. Cl.
CPC ............... B60B 7/066 (2013.01); B60B 7/04 (2013.01); *B60B 2900/1216* (2013.01)

(58) Field of Classification Search
CPC .................................. B60B 7/066; B60B 7/06
See application file for complete search history.

(56) References Cited

U.S. PATENT DOCUMENTS

| | | | | |
|---|---|---|---|---|
| 3,317,247 A | * | 5/1967 | Lamme | B60B 7/16 |
| | | | | 70/171 |
| 3,585,824 A | * | 6/1971 | Schenk | F16B 5/10 |
| | | | | 70/168 |

(Continued)

FOREIGN PATENT DOCUMENTS

| | | |
|---|---|---|
| EP | 3037277 A1 | 6/2016 |
| KR | 19980042086 U | 9/1998 |
| KR | 20120052445 A | 5/2012 |

OTHER PUBLICATIONS

"HaloDisc, A Wheel Cover Makes Your Tesla Look Sexier", Kickstarter, Nov. 9, 2021 (https://www.kickstarter.com/projects/halodisc/halodisc-a-wheel-cover-makes-your-tesla-look-sexier) Accessed no later than Oct. 25, 2023.

(Continued)

*Primary Examiner* — Jason R Bellinger
(74) *Attorney, Agent, or Firm* — NIXON PEABODY LLP

(57)          ABSTRACT

A removable wheel cover includes a disc and a shaft assembly. The shaft assembly is attached to the disc. The shaft assembly includes an outer shaft, a contact ring spring, a push button mechanism, and a contact ring. The outer shaft includes a walled structure. The push button mechanism further includes a body including a top surface. The walled structure of the outer shaft surrounds at least a portion of the body of the push button mechanism. The contact ring spring biases the contact ring in a direction away from the top surface of the push button mechanism. The contact ring spring further biases the push button mechanism in a direction opposite of the contact ring. The push button mechanism moves to assist in unlocking the removable wheel cover and a wheel.

20 Claims, 10 Drawing Sheets

(56) References Cited

U.S. PATENT DOCUMENTS

| | | | | |
|---|---|---|---|---|
| 4,043,685 | A | 8/1977 | Hyams | |
| 5,234,260 | A | 8/1993 | Coombes, Jr. et al. | |
| 5,931,543 | A | 8/1999 | Smith | |
| 6,857,708 | B2 | 2/2005 | Hartl et al. | |
| D752,494 | S | 3/2016 | Polka | |
| 9,327,550 | B2 | 5/2016 | Butler | |
| 9,511,624 | B2 | 12/2016 | Polka | |
| 9,561,687 | B2 | 2/2017 | Polka | |
| 9,682,597 | B1 | 6/2017 | Mavrofrides | |
| 10,513,144 | B2 | 12/2019 | Heck | |
| 10,543,716 | B1 | 1/2020 | Mavrofrides | |
| 11,207,915 | B1 | 12/2021 | Mavrofrides | |
| 2005/0146204 | A1* | 7/2005 | Kim | B60B 7/14 301/37.25 |
| 2013/0076107 | A1 | 3/2013 | Starnes et al. | |
| 2024/0123761 | A1* | 4/2024 | Migas | B60B 7/0013 |
| 2025/0128541 | A1* | 4/2025 | Rodrigues | B60B 7/04 |

OTHER PUBLICATIONS

"Tesla Model 3 (2020-2023) 18-inch Hub Caps (Set of 4)", Mayde (https://www.mayde.us/products/mayde-wheel-covers-for-tesla-model-3?variant=41428058570904) Accessed no later than Oct. 25, 2023.

"Wheel Cover Kits: Fuel-Saving Aerodynamics for Tractor and Trailer", FlowBelow (https://www.flowbelow.com/wheel-cover-kits) Accessed no later than Oct. 25, 2023.

"Aerodynamic Wheel Covers", RealWheels Corporation (https://www.realwheels.com/aerodynamic-wheel-covers/) Accessed no later than Oct. 25, 2023.

"MagBak RimCase for Tesla Model 3 & Y (4 Pack)", MagBak (https://magbak.com/products/magbak-rim-protector?utm_source=google&utm_medium=&utm_campaign=&utm_term=&gad=1&gclid=CjwKCAjw-KpBhAbEiwAqFL0mvb3Jn7adHhCPBRCUkcTO2W-4qpGdKn2KMgpVoD0IC7Jh7_JIfTc6BoCMVUQAvD_BwE) Accessed no later than Oct. 25, 2023.

* cited by examiner

REMOVABLE AERODYNAMIC WHEEL COVER

CROSS-REFERENCE TO RELATED APPLICATION

This application claims priority to and the benefit of U.S. Provisional Application No. 63/379,331 filed Oct. 13, 2022 and entitled "Removable Aerodynamic Wheel Cover," the contents of which are herein incorporated by reference in their entirety.

FIELD OF THE INVENTION

The present invention relates generally to an aerodynamic wheel cover. More specifically, the wheel cover locks with a wheel and is configured to be easily released by a user.

BACKGROUND OF THE INVENTION

Wheel covers have been used to cover wheels in the automotive industry for many years. One disadvantage of many such wheel covers is the difficulty for users to install and release the wheel cover from the wheel. This is especially important in wheel covers that are used with electric vehicles due to the increased emphasis on range. Improved aerodynamics are more important on longer high-speed trips, and aesthetics are more important on shorter, low-speed trips. It would be desirable to provide an easily removable aerodynamic wheel cover that overcomes such problems.

SUMMARY

According to one aspect of the present disclosure, a removable wheel cover includes a disc and a shaft assembly. The shaft assembly is attached to the disc. The shaft assembly includes an outer shaft, a contact ring spring, a push button mechanism, and a contact ring. The outer shaft includes a walled structure. The push button mechanism further includes a body including a top surface. The walled structure of the outer shaft surrounds at least a portion of the body of the push button mechanism. The contact ring spring biases the contact ring in a direction away from the top surface of the push button mechanism. The contact ring spring further biases the push button mechanism in a direction opposite of the contact ring. The push button mechanism is configured to move to assist in unlocking the removable wheel cover and a wheel.

According to a configuration of the above implementation, the disc is generally circular.

According to another configuration of the above implementation, the disc forms a plurality of apertures therein.

According to a further configuration of the above implementation, the shaft assembly further includes a button spring. The button spring biases the top surface of the push button mechanism in a direction toward the wheel in an unlocked position.

In a further aspect of the above implementation, the shaft assembly is removably attached to the disc. The shaft assembly may be removably attached to the disc via at least one screw.

In yet a further aspect of the above implementation, the shaft assembly further includes a plurality of ball bearings. The plurality of ball bearings assists in locking and unlocking the removable wheel cover and the wheel. In this embodiment, the outer shaft may include at least one opening. The at least one opening of the outer shaft is configured to receive at least a portion of each of the plurality of ball bearings. The outer shaft and the push button mechanism assist in unlocking the removable wheel cover and the wheel.

According to another configuration of the above implementation, the push button mechanism includes a lower extension located opposite of the top surface. The lower extension extends outwardly and is configured to assist in locking the removable wheel cover and the wheel.

According to a further configuration of the above implementation, the removable wheel cover is directly locked to the wheel.

According to another aspect of the present disclosure, a wheel assembly includes a wheel and a removable wheel cover. The wheel includes a tire, and a wheel hub. The removable wheel cover includes a disc and a shaft assembly. The shaft assembly is attached to the disc. The shaft assembly includes an outer shaft, a contact ring spring, a push button mechanism, and a contact ring. The outer shaft includes a walled structure. The push button mechanism further includes a body including a top surface. The walled structure of the outer shaft surrounds at least a portion of the body of the push button mechanism. The contact ring spring biases the contact ring in a direction away from the top surface of the push button mechanism. The contact ring spring further biases the push button mechanism in a direction opposite of the contact ring. The push button mechanism is configured to move to assist in unlocking the removable wheel cover from a wheel.

According to a configuration of the above implementation, the removable wheel cover is configured to be locked and unlocked directly with the wheel.

According to another configuration of the above implementation, the wheel hub forms an undercut. The shaft assembly further includes a plurality of ball bearings. Each of the plurality of ball bearings is configured to contact the undercut formed in the wheel hub to assist in locking the removable wheel cover and the wheel.

According to a further configuration of the above implementation, the shaft assembly further includes a button spring. The button spring biases the top surface of the push button mechanism in a direction toward the wheel in an unlocked position.

In a further aspect of the above implementation, the shaft assembly further includes a plurality of ball bearings. The plurality of ball bearings assists in locking and unlocking the removable wheel cover and the wheel.

In a further aspect of the above implementation, the outer shaft includes at least one opening. The at least one opening of the outer shaft is configured to receive at least a portion of each of the plurality of ball bearings. The outer shaft and the push button mechanism assist in unlocking the removable wheel cover and the wheel.

In yet a further aspect of the above implementation, the push button mechanism includes a lower extension located opposite of the top surface. The lower extension extends outwardly and is configured to contact the plurality of ball bearings in a locked position.

According to one method of the present disclosure, a removable wheel cover assembly is installed into a wheel. This method includes providing a removable wheel cover including a disc and a shaft assembly. The shaft assembly is attached to the disc. The shaft assembly includes an outer shaft, a contact ring spring, a push button mechanism, and a contact ring. The outer shaft includes a walled structure. The push button mechanism further includes a body including a top surface. The walled structure of the outer shaft surrounds at least a portion of the body of the push button mechanism. The contact ring spring biases the contact ring in a direction away from the top surface of the push button mechanism. The contact ring spring further biases the push button mechanism in a direction opposite of the contact ring. A wheel including a tire, and a wheel hub is provided. The removable wheel cover is placed into an opening in the wheel hub such that the removable wheel cover locks with the wheel.

According to a configuration of the above method, the push button mechanism is pressed to unlock the removeable wheel cover and the wheel.

According to a configuration of the above method, the removable wheel cover is placed into the opening of the wheel hub such that the removable wheel cover locks with the wheel in the absence of tooling.

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

Figures 1A, 1B, 1C:
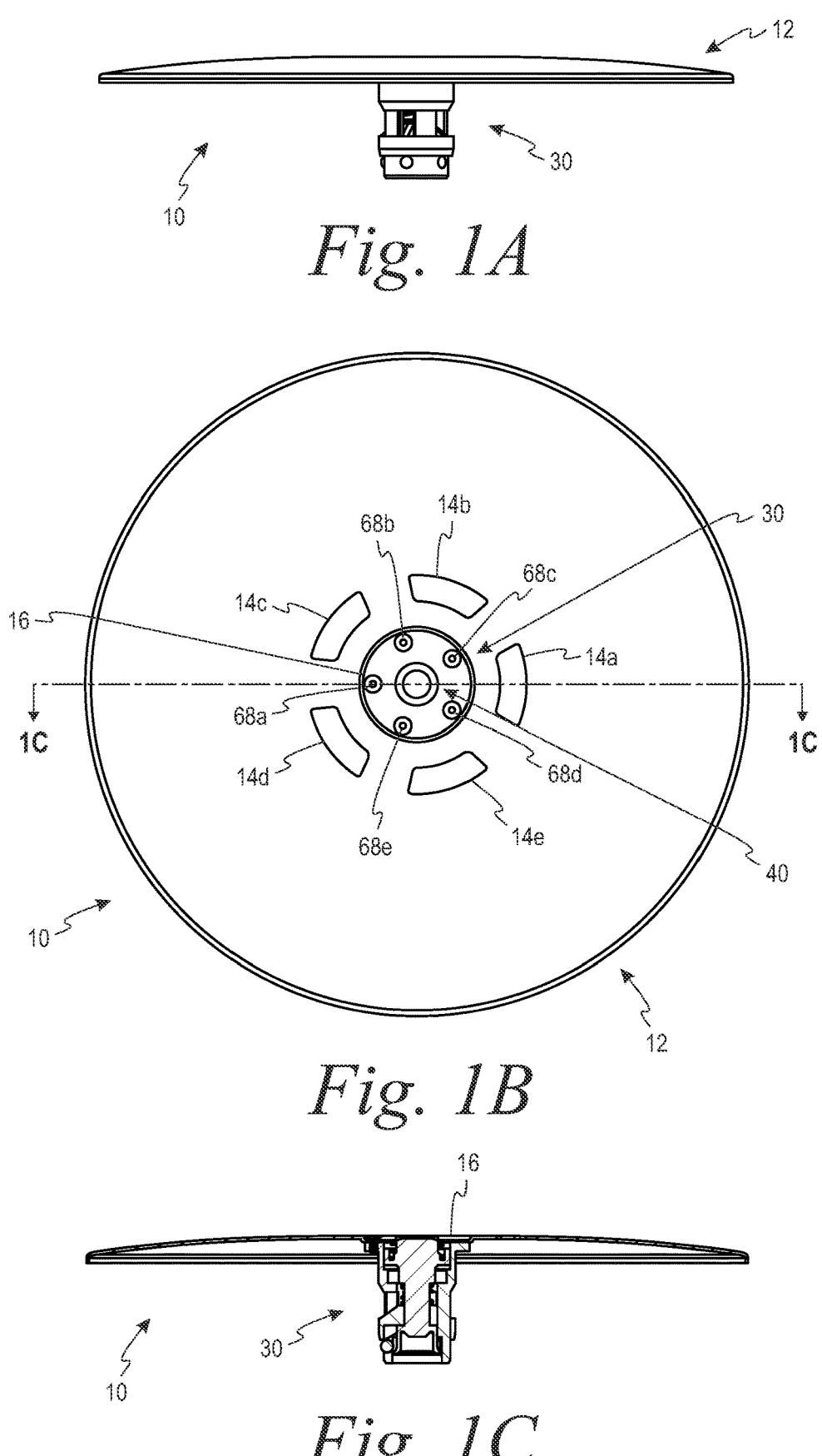
FIG. 1A is a side view of a removable wheel cover according to one embodiment.
FIG. 1B is a front view of the removable wheel cover of FIG. 1A.
FIG. 1C is a cross-sectional view taken generally along line 1C-1C of the removable wheel cover of FIG. 1B.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

FIGS. 1A-1D illustrate a removable wheel cover 10 according to one embodiment. The removable wheel cover 10 includes a disc 12 and a shaft assembly 30 that is removably assembled or attached to the disc 12 in this embodiment. The removable wheel cover 10 is configured to provide improved aerodynamics to a wheel. Aerodynamics are important to vehicles to reduce drag and wind noise, minimize noise emission, and prevent or inhibit undesired lift forces and other causes of instabilities that occur at higher speeds. By being more aerodynamic, the vehicle runs more efficiently, yielding greater available range. The removable wheel cover 10 can be used on wheels of various vehicles including, but not limited to, cars, trucks and vans.

The disc 12 as shown best in FIG. 1B is generally circular shaped. More specifically, in this embodiment, the disc 12 is substantially circular shaped or circular shaped. The disc is typically shaped and sized to provide improved aerodynamics to a wheel. The disc typically covers or substantially covers a disc of the wheel. It is contemplated that the disc may be of other sizes and shapes.

As shown in FIGS. 1B, 1C, for example, the disc 12 includes a disc flange 16. The disc flange 16 is located in a general central portion of the disc 12. The disc 12 forms a plurality of openings 14a-14e therein. The plurality of openings 14a-14e has several functions. The plurality of openings 14a-14e assists: (1) a user in handling the removable wheel cover when the removable wheel cover is being assembled or disassembled directly with the wheel; and (2) in providing passive cooling to the components located within the disc wheel, including the braking system. The plurality of openings 14a-14e is generally rectangular or generally trapezoidal shaped to assist a user in handling the removable wheel cover during assembly or disassembly. It is contemplated that the plurality of openings may be other shapes and sizes.

Figure 1D:
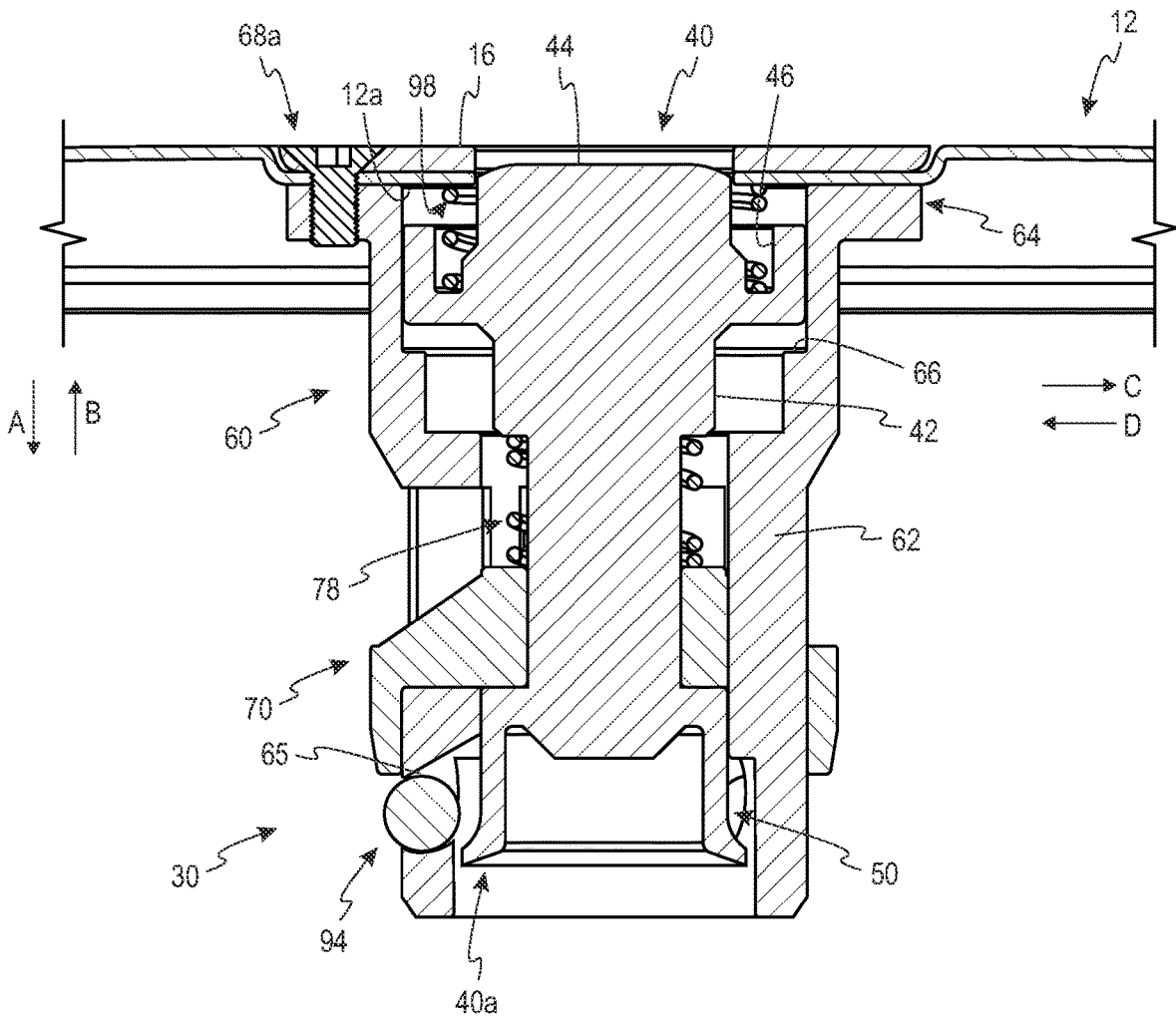
FIG. 1D is a partial, enlarged cross-sectional view of the removable wheel cover of FIG. 1C.
Figure 4:
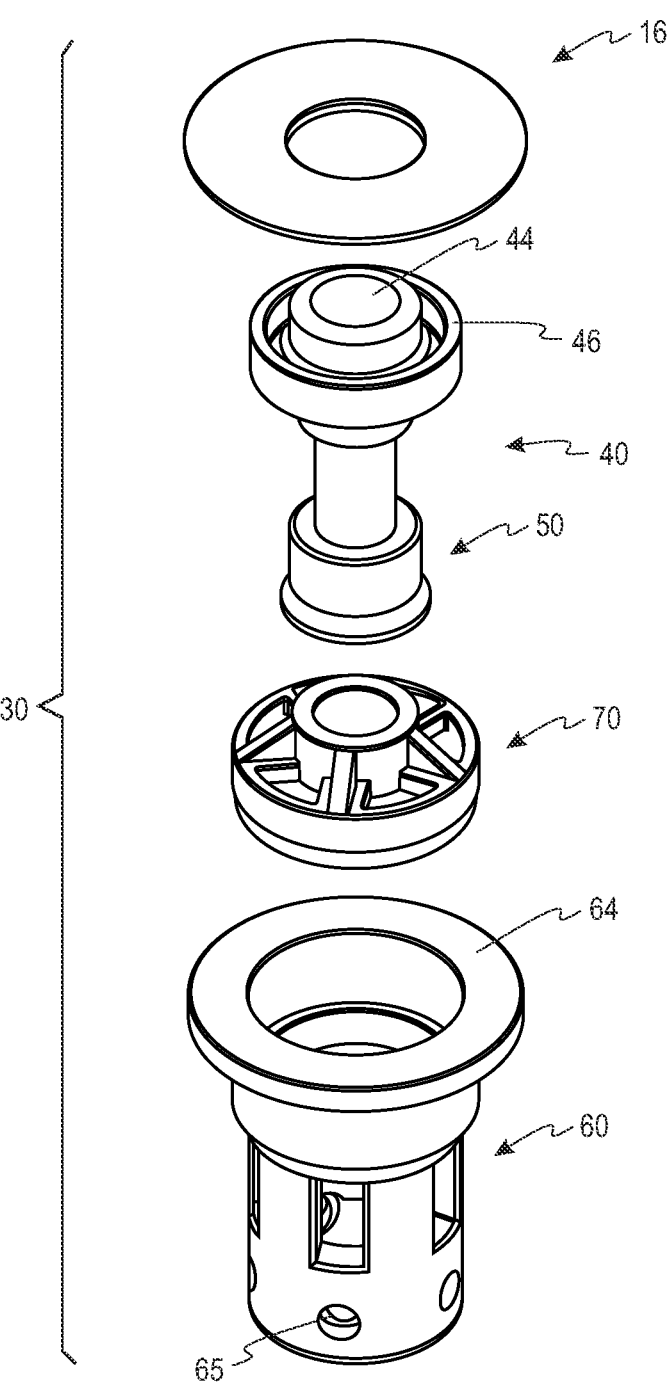
FIG. 4 is an exploded view of a shaft assembly according to one embodiment.

Referring to FIG. 1D, the shaft assembly 30 is shown in an enlarged cross-sectional view being assembled to the disc 12. The shaft assembly 30 includes a push button mechanism 40, an outer shaft 60, a contact ring 70, and a contact ring spring 78 in this embodiment. The shaft assembly 30 is shown in FIG. 4 in an exploded view without springs.

The contact ring spring 78 biases the contact ring 70 in a downwardly direction (in the direction of arrow A) in FIG. 1D, which is away from a top surface 44 of the push button mechanism 40. In practice, however, when the removable wheel cover 10 is installed into a wheel, as will be discussed below, the contact ring spring 78 biases the contact ring 70 in an inwardly direction into a wheel hub of a wheel.

The contact ring spring 78 also further biases the push button mechanism 40 in a direction opposite of the contact ring 70. In practice, however, when the removable wheel cover 10 is installed directly into a wheel, as will be discussed below, the contact ring spring 78 will bias the push button mechanism 70 in an outwardly direction away from a wheel hub of a wheel.

As will be discussed in more detail below with respect to FIGS. 3A-3D, the push button mechanism 40 assists in unlocking the removable wheel cover 10 and the wheel 100 in this embodiment. The push button mechanism 40 includes a body 42 that includes the top surface 44. It is contemplated that the push button mechanism may be formed by a walled structure instead of a body, such as a solid body.

The body 42 includes an outward extension 46 extending outwardly and upwardly (direction of arrow B) therefrom. At or near an end 40*a* opposite of the top surface 44, the push button mechanism 40 forms a lower extension 50 extending slightly outwardly and downwardly (in the direction of arrow A). The lower extension 50 is configured to assist in locking the removable wheel cover 10 with the wheel 100.

In this embodiment, the shaft assembly 30 further includes a button spring 98. The button spring 98 biases the push button mechanism 40 in a downwardly direction (in the direction of arrow A) in FIG. 1D. The amount of travel of the push button mechanism 40 is limited by the movement of the outward extension 46 that extends from the body 42. The movement of the outward extension 46 is limited by an internal shoulder 66 of the outer shaft 60 in one direction and a surface 12*a* of the disc 12 in the other direction. In practice, however, with a wheel, the contact ring spring 78 will bias the contact ring 70 towards the wheel 100 in an unlocked position or state.

It is contemplated that a button spring may be omitted in other shaft assemblies. It is advantageous, however, to include a button spring because a user can more easily determine if the shaft assembly 30 is in a locked position by the position of the top surface 44 of the push button mechanism 40. If a button spring is not used, the push button mechanism 40 can more freely move and may be in a position that at first glance a user believes to be in a locked position, but is in an unlocked position. If the button spring is not used, a user will need to push down (toward the wheel) on the push button mechanism to lock the removable wheel cover and the wheel. The functional aspects, as will be discussed below, of locking and unlocking does not change on whether a button spring is present.

Referring still to FIG. 1D, the outer shaft 60 includes a walled structure 62 and an outwardly extending flange 64. The outwardly extending flange 64 is generally perpendicular or perpendicular to the walled structure 62 in this embodiment. The outwardly extending flange 64 is located adjacent to the surface 12*a* of the disc 12. The walled structure 62 of the outer shaft 60 surrounds or telescopes at least a portion of the body 42 of the push button mechanism 40. The walled structure 62 of the outer shaft 60 also abuts the outward extension 46 in this embodiment.

As shown in FIGS. 1B, 1D, the outwardly extending flange 64 forms a plurality of threaded apertures that is configured to receive a corresponding one of a plurality of flange screws 68*a*-68*e* (only one of the flange screws 68*a* is shown in FIG. 1D). The plurality of flange screws 68*a*-68*e* assists in securing the shaft assembly 30 to the disc 12. By removing the plurality of flange screws 68*a*-68*e*, the disc 12 can be removed from the shaft assembly 30. It is contemplated that the number of flange screws may vary. It is also contemplated that other fasteners may be used or other methods for attaching or removably attaching a disc and an outer shaft assembly. It is also contemplated that other methods may be used for attaching or removably attaching a disc and an outer shaft assembly.

The shaft assembly 30 further includes a plurality of ball bearings 94. One of the plurality of ball bearings 94 is shown in FIG. 1D. The plurality of ball bearings 94 resides in a respective one of the plurality of apertures 65 formed in the outer shaft 60. One of the plurality of apertures 65 formed in the outer shaft 60 is shown in FIG. 1D. Each of the plurality of ball bearings 94 is generally circular in shape. As will be discussed in detail below, the plurality of ball bearings 94 assists in locking and unlocking the removable wheel cover 10 and the wheel 100 in this embodiment. When the ball bearings 94 are received in an opening 65 of the outer shaft 60 and are underneath an undercut formed in the wheel hub, the removable wheel cover 10 is in a locked position with the wheel 100. Each of the ball bearings 94 will be locked at the same time in respective openings 65 of the outer shaft 60. These openings 65 are shown best in FIG. 4 and are sized to allow a respective one of the ball bearings to extend therethrough and assist in locking the shaft assembly 30 and the wheel 100.

The number of ball bearings in the shaft assembly 30 generally varies from about 3 to about 20. The number of ball bearings is typically from about 3 to about 10, and more typically from about 4 to about 8. The ball bearings 94 are typically spaced equidistant around the circumference of an outer shaft 60.

The locking and unlocking of the removable wheel cover and the wheel may be performed by methods other than those using ball bearings. In one non-limiting example, a continuous ring or a plurality of rings may be used that would extend through, for example, a groove or a plurality of openings formed in the outer shaft.

The disc 10 may be made of different materials. Non-limiting examples of material that may form the disc include metal and polymeric metals. Examples of metallic materials include, but are not limited to, aluminum and stainless steel. Examples of polymeric materials include, but are not limited to, polyolefins (e.g., acrylonitrile butadiene styrene (ABS)), carbon-fiber reinforced polymers, and nylon (e.g., nylon-filled material). One non-limiting example of a nylon-filled material is a glass-filled nylon. It is contemplated that other polyolefins may be used in forming the disc.

The shaft assembly 30 including the outer shaft 60, the contact ring 70 and the push button mechanism 40 may be made of different materials. Non-limiting examples of material that may form the shaft assembly include metal and polymeric metals. Examples of metallic materials include, but are not limited to, aluminum and stainless steel. Examples of polymeric materials include, but are not limited to, polyolefins (e.g., acrylonitrile butadiene styrene (ABS)), carbon-fiber reinforced polymers, and nylon (e.g., nylon-filled material). One non-limiting example of a nylon-filled material is a glass-filled nylon. It is contemplated that other polyolefins may be used in forming the shaft assembly.

Figure 2A:
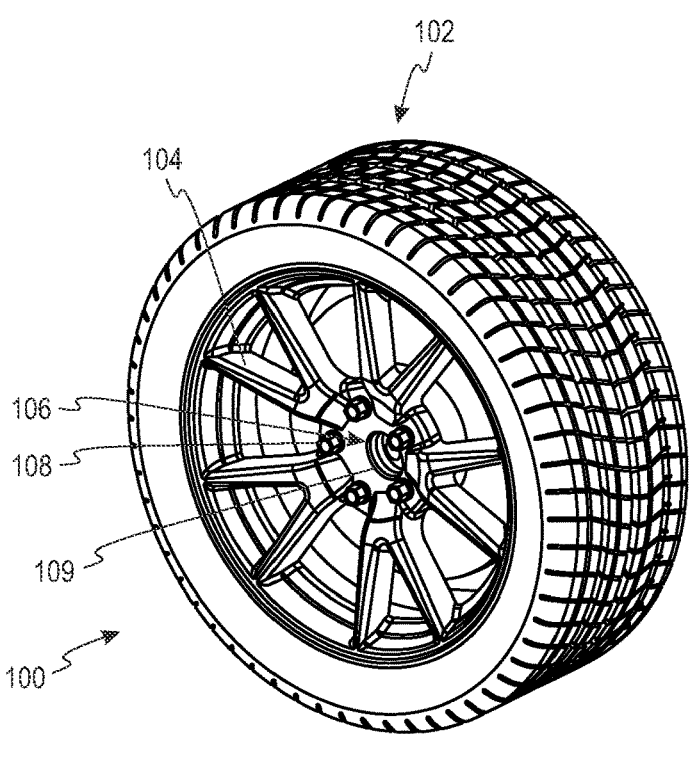
FIG. 2A is a front perspective view of a wheel according to one embodiment.
Figure 2B:
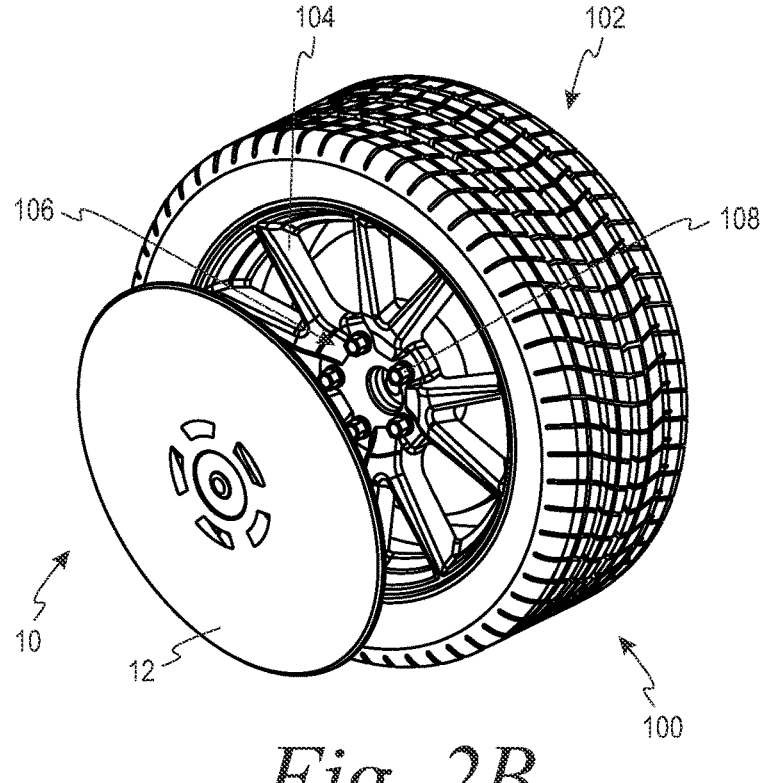
FIG. 2B is the front perspective view of the wheel of FIG. 2A in the process of the removable wheel cover of FIG. 1A being installed.
Figure 2C:
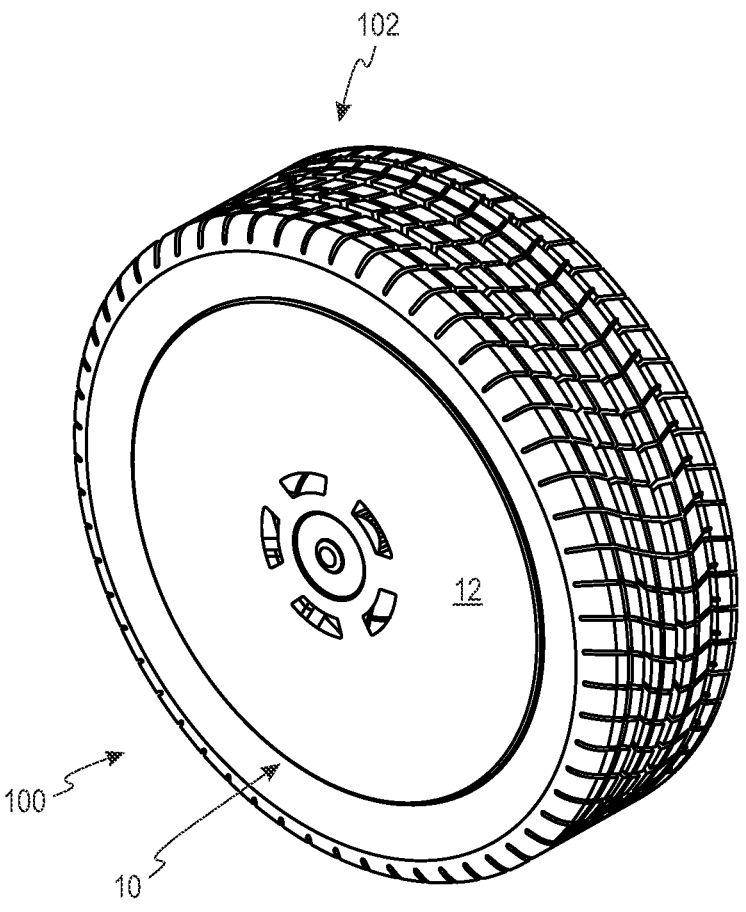
FIG. 2C is the front perspective view of the wheel of FIG. 2A with the wheel cover of FIG. 1A being assembled thereto.

Referring to FIGS. 2A-2C, a method of placing the removable wheel cover 10 into a wheel 100 is shown. Referring initially to FIG. 2A, the wheel 100 includes a tire 102, a disc wheel 104, and a wheel hub 106. The tire 102, which is the width of the wheel 100, surrounds the disc wheel 104. The tire 102 gives the wheel 100 a grip on a road surface. The wheel hub 106 is where the wheel 100 is attached to a remainder of the vehicle. In this embodiment, the wheel hub 106 includes a plurality of lug nuts 108 to attach the wheel 100 to a wheel stud of the vehicle. The wheel hub 106 forms an internal opening 109. FIG. 2B shows the wheel 100 during the process of assembling the removable wheel cover 10, while FIG. 2C shows the wheel 100 and the removable wheel cover 10 being in an assembled state.

Figure 3A:
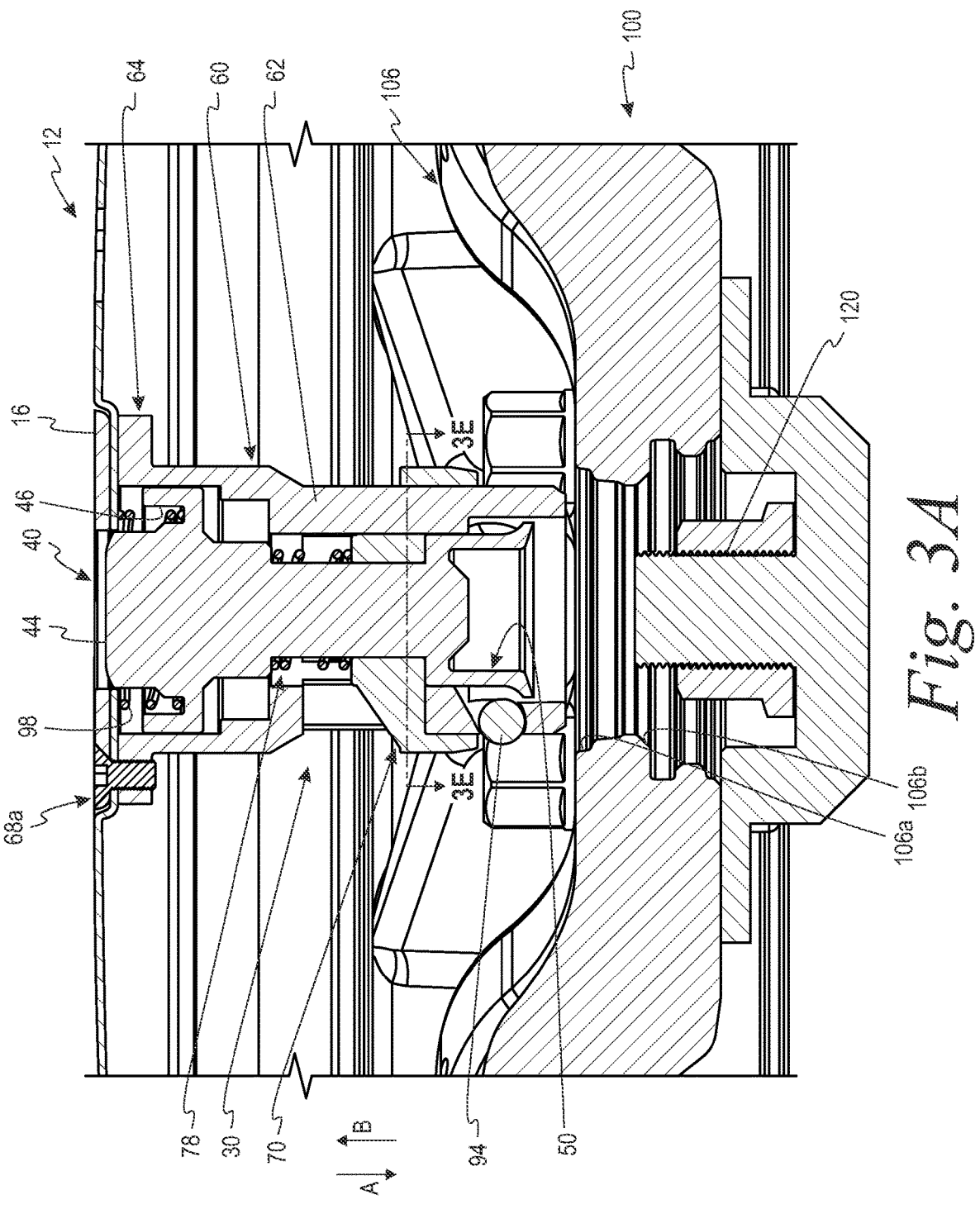
FIG. 3A is a cross-sectional view of a portion of the removable wheel cover of FIG. 1A in the process of being assembled or attached into the wheel of FIG. 2A.

The process of locking and unlocking the removable wheel cover 10 to the wheel 100 is shown in conjunction with various cross-sectional views of FIGS. 3A-3E. Referring initially to FIG. 3A, the process of locking the removable wheel cover 10 has begun by moving the removable wheel cover 10 towards the wheel 100 (in the direction of arrow A in FIG. 3A).

Figure 3B:
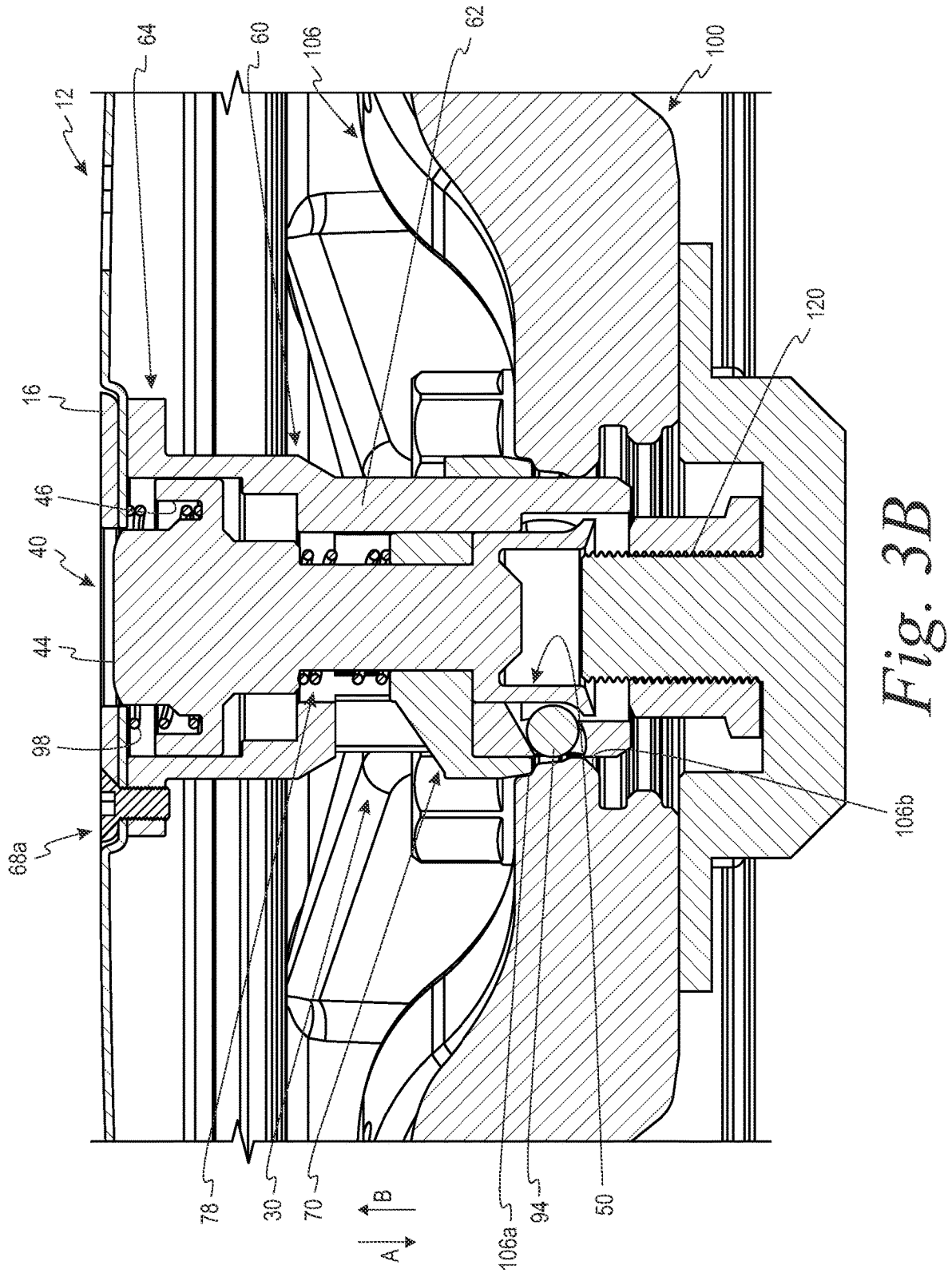
FIG. 3B is another cross-sectional view of a portion of the removable wheel cover of FIG. 1A into the wheel of FIG. 2A.

As the removable wheel cover 10 continues moving toward the threaded axle end 120, the contact ring 70 contacts inner surface 106*a* of the wheel hub 106 of the wheel 100 as shown in FIG. 3B. The contact ring 70 provides a solid surface from which pressure can be applied during the installation of the shaft assembly 30 into the wheel 100. The top surface 44 of the push button mechanism 40 is popped up (direction of arrow B in FIG. 3C) at this point in the process. More, specifically, the top surface 44 of the push button mechanism 40 extends above the remainder of the removable wheel cover 10, which is in the direction away from the threaded axle end 120. This indicates to a user that the removable wheel cover 10 is locked into the wheel 100.

Figure 3C:
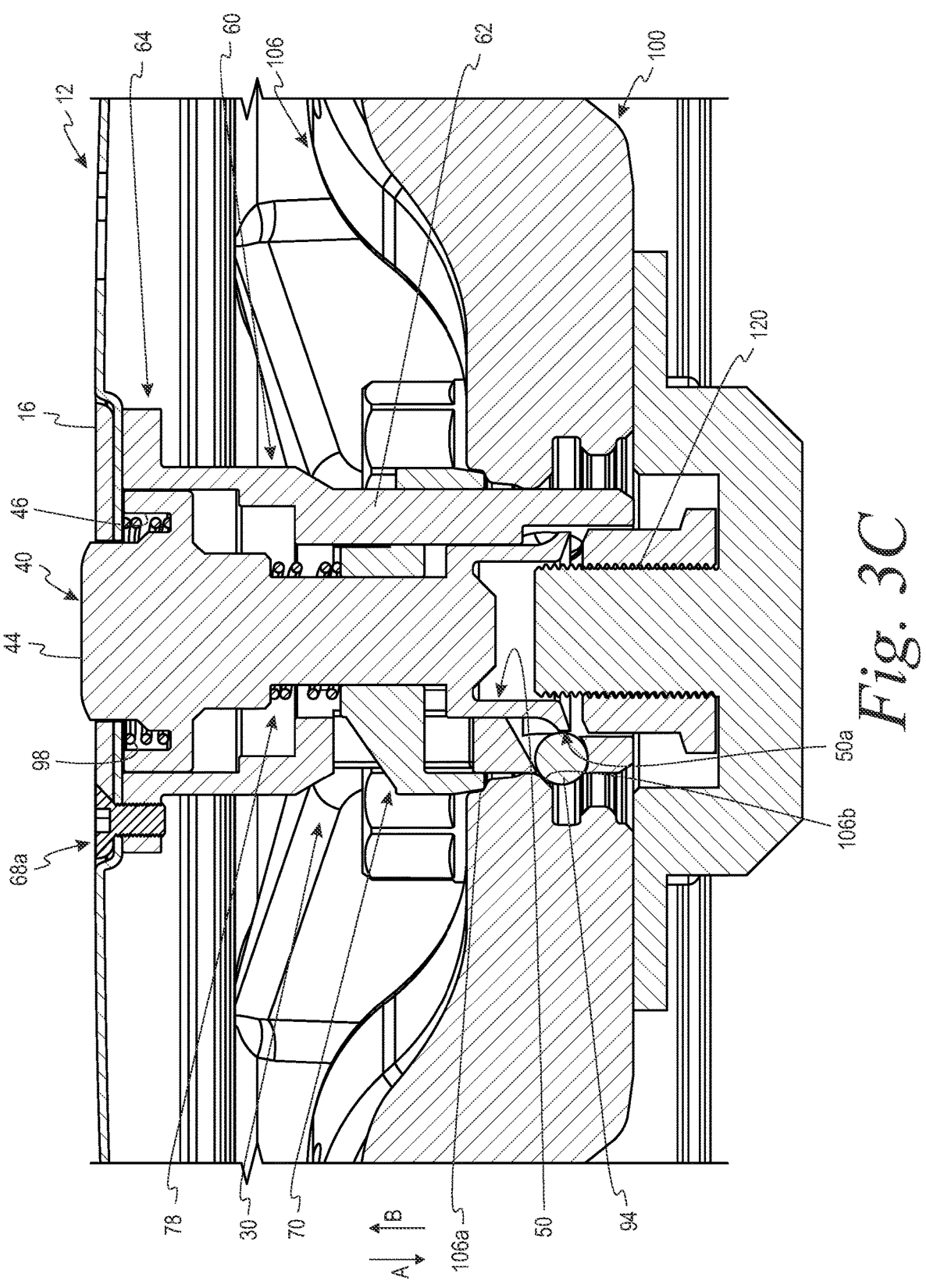
FIG. 3C is a cross-sectional view of a portion of the removable wheel cover of FIG. 1A shown in a locked position with the wheel of FIG. 2A.

In the locked position of FIG. 3C, the ball bearing 94 is located in the opening 65 of the outer shaft 60. More specifically, each of the ball bearings 94 is located in a respective one of the openings 65 of the outer shaft 60. Each of the ball bearings 94 is located underneath an undercut 106*b* of the wheel hub 106 that prevents or inhibits movement of the shaft assembly 30 from moving in the direction of arrow B. Each of the ball bearings 94 has moved outwardly from their original position of FIG. 3A. An end 50*a* of the lower extension 50 in this position of FIG. 3C contacts the ball bearing 94 to assist in preventing or inhibiting movement of the ball bearing 94. With the ball bearing 94 being in the position of FIG. 3C (locked), a user cannot remove the removable wheel cover 10 from the wheel 100 without pressing on the push button mechanism 40.

Figure 3D:
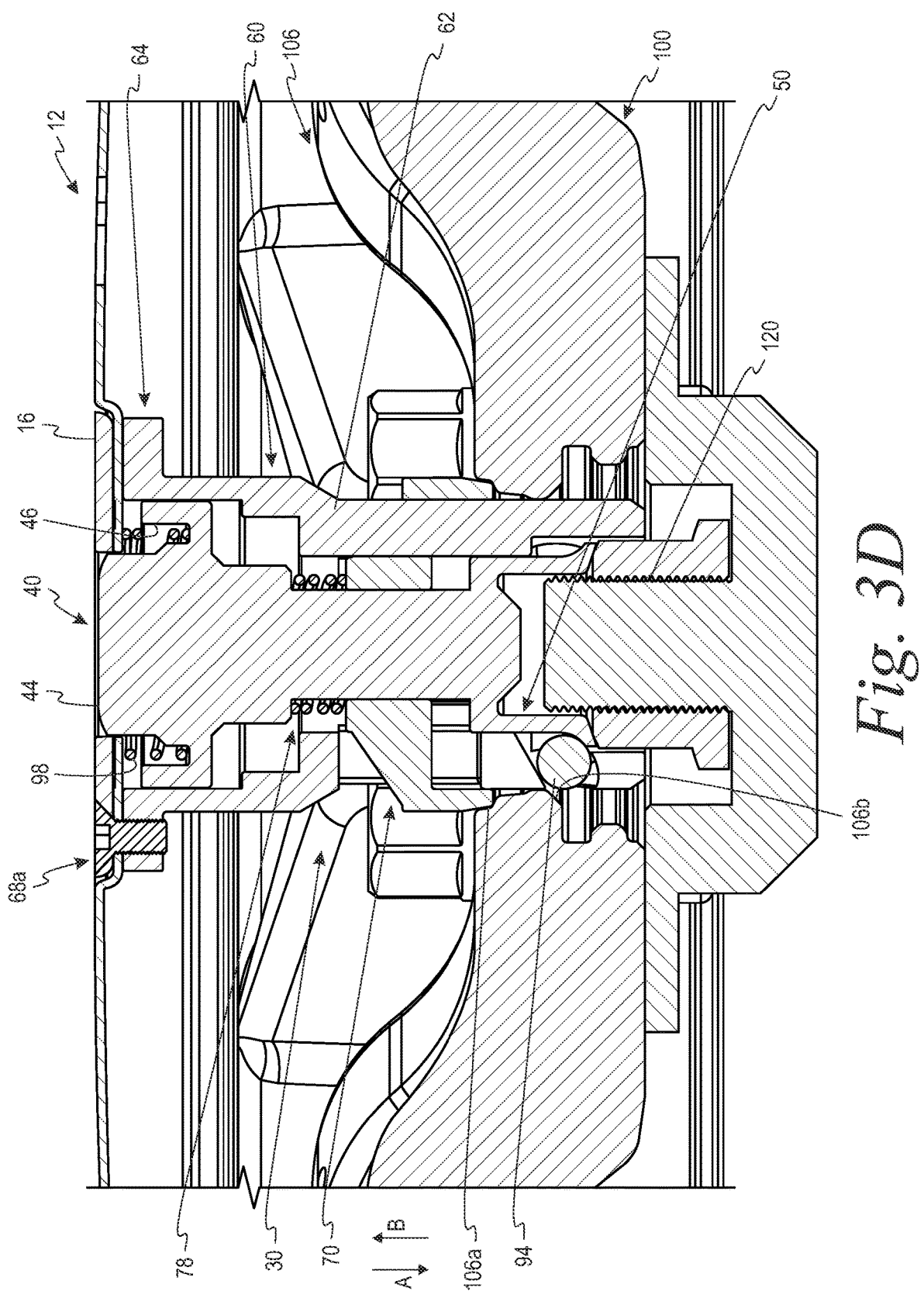
FIG. 3D is a cross-sectional view of a portion of the removable wheel cover of FIG. 1A after pushing the push button mechanism from the locked position of FIG. 3C, resulting in an unlocked position with the wheel of FIG. 2A.
Figure 3E:
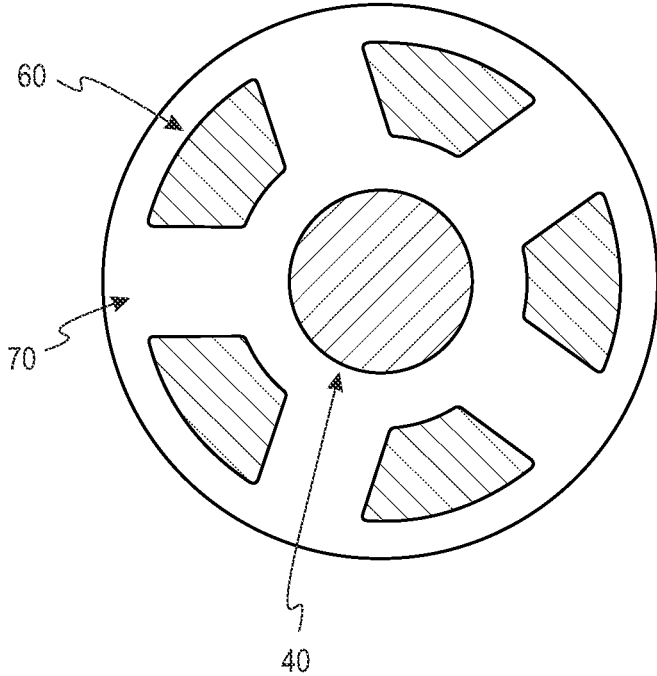
FIG. 3E is a cross-sectional view taken generally along line 3E-3E of FIG. 3A.

To unlock the removable wheel cover 10 from the wheel 100, a user presses the top surface 44 of the push button mechanism 40 in the direction of arrow A. When the top surface 44 is pressed downwardly (in the direction of arrow A), the ball bearing 94 is biased upwardly (direction of arrow B) and inwardly from the position of FIG. 3C (locked) to FIG. 3D (unlocked). This moves the ball bearings 94 from the respective openings 65 of the outer shaft 60. After the user presses the top surface 44 of the push button mechanism 40 in the direction of arrow A, the removable wheel cover 10 is unlocked as shown in FIG. 3D, which enables a user to move the removable wheel cover 10 in the direction of arrow B (away from the threaded axle end 120) to the position of FIG. 3A. In one embodiment, to assist in removing the removable wheel cover, a disc may be sized and shaped to have a spring force that deflects from the tire.

Thus, a method of installing a removable wheel cover assembly into a wheel in one embodiment includes providing a removable wheel cover. The removable wheel cover is placed into an opening in the wheel hub such that the removable wheel cover locks with the wheel. The removeable wheel cover is unlocked in this method by pressing on the push button mechanism. Thus, the process of locking and unlocking the removable wheel cover 10 can be performed in the absence of any tooling.

In an effort to mitigate unwelcome wheel cover removal, a key locking mechanism may be desirable in other embodiments. Such a mechanism may be achieved via a key lock assembly located within the push button mechanism allowing an arm or a plurality of arms to rotate, via key turn, into a groove formed within the outer shaft. Such a configuration would lock the wheel cover to the wheel and would prevent or inhibit removal of the wheel cover without using the key. It is contemplated that other locking mechanisms may be used.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A removable wheel cover comprising:
   a disc; and
   a shaft assembly being attached to the disc, the shaft assembly including an outer shaft, a contact ring spring, a push button mechanism, and a contact ring, the outer shaft included a walled structure, the push button mechanism further including a body including a top surface, the walled structure of the outer shaft surrounding at least a portion of the body of the push button mechanism, the contact ring spring biasing the contact ring in a direction axially away from the top surface of the push button mechanism, the contact ring spring further biasing the push button mechanism in a direction axially opposite of the contact ring,
   wherein the push button mechanism is moveable to assist in unlocking the removable wheel cover and a wheel.

2. The wheel cover of claim 1, wherein the disc is generally circular.

3. The wheel cover of claim 1, wherein the disc forms a plurality of apertures therein.

4. The wheel cover of claim 1, wherein the shaft assembly further includes a button spring, the button spring biasing the top surface of the push button mechanism in an axially direction toward the wheel in an unlocked position.

5. The wheel cover of claim 1, wherein the shaft assembly is removably attached to the disc.

6. The wheel cover of claim 5, wherein the shaft assembly is removably attached to the disc using at least one screw.

7. The wheel cover of claim 1, wherein the shaft assembly further includes a plurality of ball bearings, the plurality of ball bearings assisting in locking and unlocking the removable wheel cover and the wheel.

8. The wheel cover of claim 7, wherein the outer shaft includes at least one opening, the at least one opening of the outer shaft receives at least a portion of each of the plurality of ball bearings, the outer shaft and the push button mechanism assist in locking and unlocking the removable wheel cover and the wheel.

9. The wheel cover of claim 1, wherein the push button mechanism includes a lower extension located opposite of the top surface, the lower extension extending radially outwardly and assisting in locking the removable wheel cover and the wheel.

10. The wheel cover of claim 1, wherein the removable wheel cover is directly locked to the wheel.

11. A wheel assembly comprising:
    a disc wheel including a tire and a wheel hub; and
    a removable wheel cover including a disc and a shaft assembly, the shaft assembly being attached to the disc, the shaft assembly including an outer shaft, a contact ring spring, a push button mechanism, and a contact ring, the outer shaft included a walled structure, the push button mechanism further including a body including a top surface, the walled structure of the outer shaft surrounding at least a portion of the body of the push button mechanism, the contact ring spring biasing the contact ring in a direction axially away from the top surface of the push button mechanism, the contact ring spring further biasing the push button mechanism in a direction axially opposite of the contact ring, wherein the push button mechanism is moveable to assist in unlocking the removable wheel cover from the wheel.

12. The wheel assembly of claim 11, wherein the removable wheel cover is configured to be locked and unlocked directly with the wheel.

13. The wheel assembly of claim 11, wherein the wheel hub forms an undercut, the shaft assembly further including a plurality of ball bearings, each of the plurality of ball bearings contacts the undercut formed in the wheel hub to assist in locking the removable wheel cover and the wheel.

14. The wheel assembly of claim 11, wherein the shaft assembly further includes a button spring, the button spring biasing the top surface of the push button mechanism in an axial direction toward the wheel in an unlocked position.

15. The wheel assembly of claim 11, wherein the shaft assembly further includes a plurality of ball bearings, the plurality of ball bearings assisting in locking and unlocking the removable wheel cover and the wheel.

16. The wheel assembly of claim 15, wherein the outer shaft includes at least one opening, the at least one opening of the outer shaft receives at least a portion of each of the plurality of ball bearings, the outer shaft and the push button mechanism assist in unlocking the removable wheel cover and the wheel.

17. The wheel assembly of claim 15, wherein the push button mechanism includes a lower extension located opposite of the top surface, the lower extension extending radially outwardly and contacts the plurality of ball bearings in a locked position.

18. A method of installing a removable wheel cover assembly into a wheel, the method comprising:

providing a removable wheel cover including a disc and a shaft assembly, the shaft assembly being attached to the disc, the shaft assembly including an outer shaft, a contact ring spring, a push button mechanism, and a contact ring, the outer shaft included a walled structure, the push button mechanism further including a body including a top surface, the walled structure of the outer shaft surrounding at least a portion of the body of the push button mechanism, the contact ring spring biasing the contact ring in a direction axially away from the top surface of the push button mechanism, the contact ring spring further biasing the push button mechanism in a direction axially opposite of the contact ring, providing a disc wheel including a tire and a wheel hub;

placing the removable wheel cover into an opening in the wheel hub such that the removable wheel cover locks with the wheel.

19. The method of claim 18 further including pressing on the push button mechanism to unlock the removeable wheel cover and the wheel.

20. The method of claim 19, wherein the placing of the removable wheel cover into the opening of the wheel hub such that the removable wheel cover locks with the wheel in the absence of tooling.

* * * * *